United States Patent [19]

Ford

[11] 4,378,520

[45] Mar. 29, 1983

[54] D-C RELAY RELIEF CONTROL FOR A-C ELECTRIC MOTOR

[76] Inventor: Horace B. Ford, 715 Nassau Bay II, Granbury, Tex. 76048

[21] Appl. No.: 232,695

[22] Filed: Feb. 9, 1981

[51] Int. Cl.³ .............................................. H02P 1/42
[52] U.S. Cl. .................................... 318/789; 318/790
[58] Field of Search .............. 318/794, 795, 789, 790, 318/813, 816, 817, 747, 749, 781, 785, 786; 361/187

[56] References Cited

U.S. PATENT DOCUMENTS 2,589,278  3/1952  Noodleman .......................... 318/798

Primary Examiner—David Smith, Jr.
Attorney, Agent, or Firm—Wofford, Fails & Zobal

[57] ABSTRACT

A D-C relay control is employed for a single phase induction motor for disconnecting the starting capacitors and/or starting windings from the main windings as the motor speed increases upon start up. D-C for the relay control is obtained from a rectifier coupled to the starting windings.

10 Claims, 5 Drawing Figures

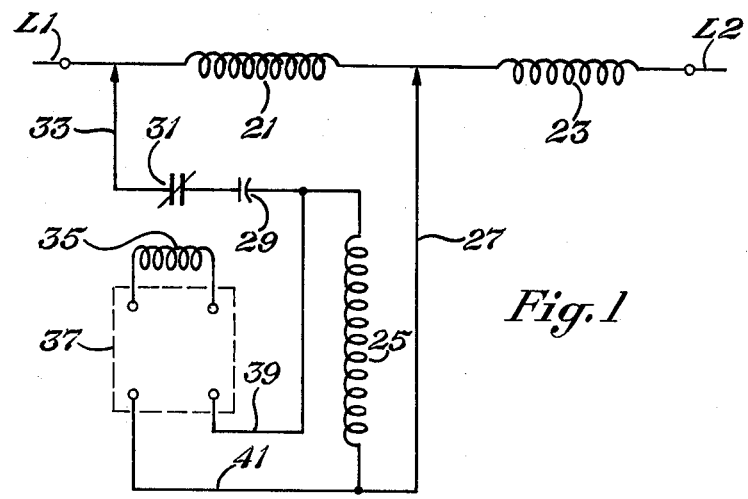
Fig.1
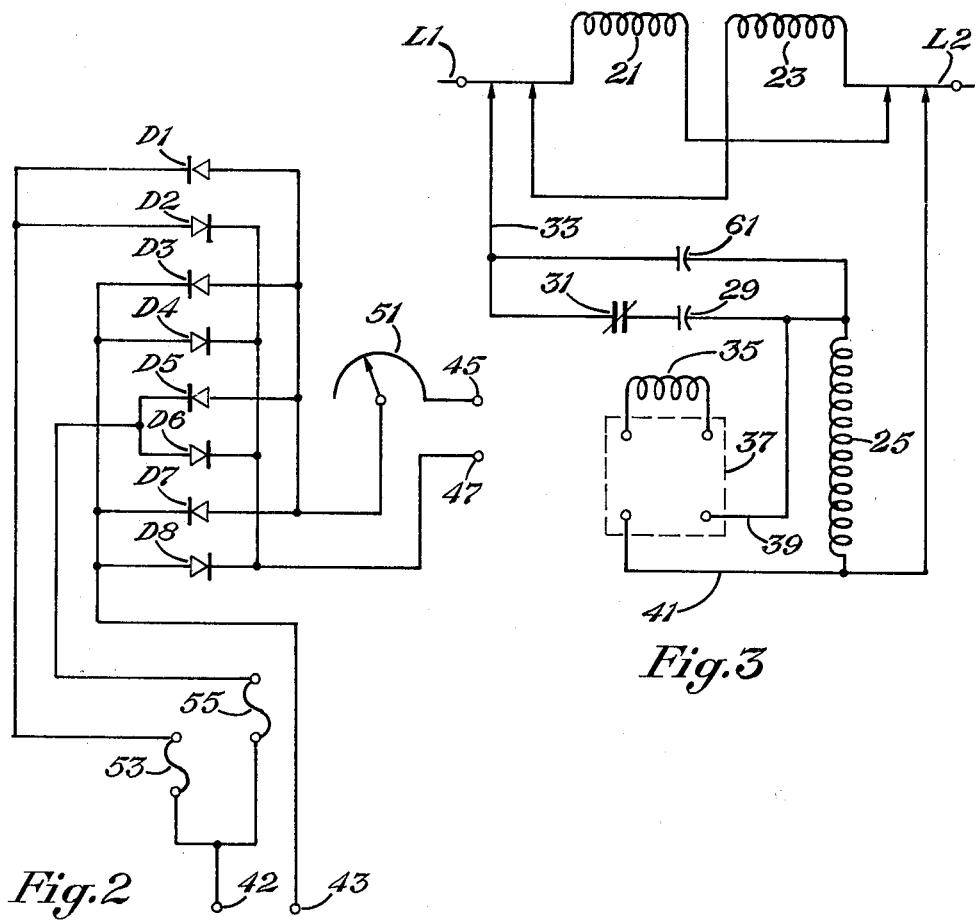
Fig.2
Fig.3

D-C RELAY RELIEF CONTROL FOR A-C ELECTRIC MOTOR

BACKGROUND OF THE INVENTION

1. Field of the Invention

The present invention relates to a relay control for the starting system of a single phase induction motor.

2. Description of the Prior Art

The relief system on typical one phase motors employ a centrifugal switch or an A-C operated relay for relieving the starting capacitors and/or starting windings after motor start-up. The centrifugal switch is operated by a centrifugal rotating device. Each different r.p.m. motor must have a different speed rotating device. The switch and rotating device are subject to wear which causes considerable problems. The A-C control relay is subject to flutter resulting from line voltage fluctuations which can cause the starting capacitors and starting windings to be repetitively switched in and out of the circuit resulting in their failure. In addition, with the use of a centrifugal switch or A-C relay for the relief system, if the motor becomes overloaded, its speed will decrease resulting in the starting capacitors and starting windings being switched in the circuit which can also result in their failure.

SUMMARY OF THE INVENTION

It is an object of the present invention to provide a control relay operated with D-C power obtained from a rectifier means coupled to the starting windings for relieving the starting capacitors and/or starting windings of a single phase motor. Such a relief system has advantages in that once the relay is actuated with D-C power to relieve the starting capacitors and/or starting windings, it will remain in that condition until the voltage drops to about zero. Thus A-C voltage fluctions and motor overload will not cause the starting capacitors and/or starting windings to be switched back in the circuit once they are relieved. In addition, the system can operate with different r.p.m. motors and has no rotating parts subject to wear.

BRIEF DESCRIPTION OF THE DRAWINGS

FIG. 1 is an electrical schematic of a small capacitor-start electric motor connected to 230 volts, single phase, and which employs a D-C relay control for relieving the starting capacitor and starting winding of the motor.

FIG. 2 is an electrical schematic of a rectifier used in the system of FIG. 1.

FIG. 3 is an electric schematic of a small capacitor-start, capacitor-run electric motor connected to 115 volts, single phase, and which employs a D-C relay control for relieving the starting capacitor of the motor.

DESCRIPTION OF THE PREFERRED EMBODIMENTS

Figure 4:
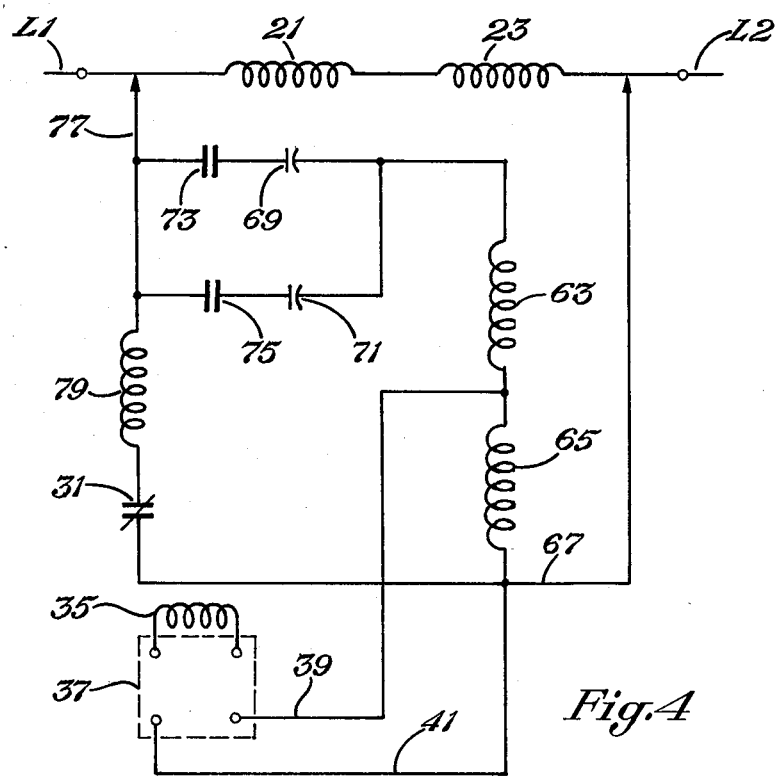
FIG. 4 is an electric schematic of a large capacitor-start electric motor connected to 230 volts, single phase, and which employs a D-C relay control for relieving the starting capacitors and starting windings of the motor.

Referring now to FIG. 1, reference numerals 21 and 23 identify the main windings of an A-C induction motor connected to lines L1 and L2 carrying 230 volts A-C, single phase. The rotor of the motor is not illustrated. Main windings 21 and 23 are connected together in series. A 115 volt starting winding 25 has one side connected between main windings 21 and 23 by way of lead 27 and the other side connected to lead L1 by way of starting capacitor 29, normally closed relay contacts 31 and lead 33. Contacts 31 are controlled by relay coil 35 which is connected to the D-C output of a rectifier 37. The rectifier 37 is shown in detail in FIG. 2. The input of rectifier 37 is connected across winding 25 by way of leads 39 and 41. This connection provides a reference voltage for the rectifier from the motor which is initially zero and builds up to 115 volts as the motor speed increases to its maximum r.p.m. upon start up.

Relay coil 35 is set to open contacts 31 when D-C voltage at its input reaches about 85 volts. Single phase 230 volts A-C is applied to L1 and L2 by closing a switch, not shown. Since contacts 31 are initially closed, starting winding 25 and starting capacitor 29 apply a large starting phase shift to the main windings 21 and 23 of the motor for starting purposes. The voltage across winding 25 is rectified to D-C by rectifier 37 and applied to relay coil 35. When the D-C voltage from rectifier 37 reaches about 85 volts (when the motor reaches about ¾ of its maximum running r.p.m.) coil 35 opens contacts 31 which disconnects the starting winding 25 and starting capacitor 29 from the main windings. The motor continues to run on single phase A-C from lines L1 and L2.

Since the relay coil 35 has D-C applied thereto, once it is actuated, it will remain actuated to maintain contacts 31 open until the voltage at its input drops to about zero. Thus line voltage fluctuations or motor overload will not cause the contacts 31 to open and close thereby protecting the starting winding 25 and starting capacitor 29.

Referring to FIG. 2, the rectifier 37 will be described. It comprises two bridge rectifiers connected between input leads 42 and 43 and output leads 45 and 47. Diodes D1–D4 form one bridge and diodes D5–D8 form the other bridge. One bridge serves as a backup if the other bridge fails. Reference numeral 51 identifies a potentiometer for varying the output of the bridge. Diodes D1–D8 each are rated at 2 to 3 amps with a peak voltage rating of 200 to 300 volts. Potentiometer 51 is a 1000 ohm, 5 watt variable potentiometer. Reference numerals 53 and 55 identify fuses, each rated at three amps.

The relief system of FIG. 1 is for a motor rated at about one h.p. or less. The starting winding 25 is rated at 115 volts. The capacitance of the starting capacitor 29 is about 600 to 1000 microfarads. The relay 35 is rated for 3 h.p. It will actuate when 70–105 volts D-C are applied to its input. It is set to actuate at about 85 volts by adjustment of potentiometer 51.

The motor of FIG. 1 may be connected to 115 volts A-C, single phase by connecting main windings 21 and 23 in parallel and connecting lead 27 to L2 instead of between main windings 21 and 23.

The motor of FIG. 1 may be converted to a split-phase motor by removing the starting capacitor 29 and by changing the number of turns and the size of the wire for the starting winding 25. In this embodiment, relay control 35, 37 will disconnect the starting winding 25 from the main windings upon start up as described in connection with the system of FIG. 1 for protecting the starting winding.

FIG. 3 illustrates the D-C relay control 35, 37 connected to a one h.p. or less, capacitor-start, capacitor-run motor. Like reference characters identify like components as described in connection with the system of FIG. 1. The main windings 21 and 23 are connected in parallel and to 115 volts A-C, single phase. Running capacitor 61 is connected to starting winding 25 and to L1 by way of lead 33. The D-C relay control 35, 37 operates in the same manner as described in connection with the system of FIG. 1 in relieving starting capacitor 29. The starting winding 25, however, stays in the circuit through running capacitor 61. The running capacitor 61 may have a capacitance of about 15 microfarads. Since in this embodiment, only a small amount of current is drawn though the starting winding 25, A-C voltage fluctuations will not affect the winding 25.

FIG. 4 illustrates the D-C relay control 35, 37 connected to a three h.p. or greater, capacitor-start motor. Like reference characters identify like components as described in connection with the system of FIG. 1. The main windings 21 and 23 are connected in series to 230 volts A-C, single phase. The rotor of the motor is not shown. Starting windings 63 and 65 are connected to L2 by way of lead 67 and to L1 by way of starting capacitors 69 and 71, normally open contacts 73 and 75 and lead 77. Normally closed relay contacts 31 are connected to lead 67 and to a large relay coil 79 which in turn is connected to lead 77. When relay coil 79 is energized, it closes contacts 73 and 75. Leads 39 and 41 from rectifier 37 are connected across winding 65. Relay coil 35 is set to open contacts 31 when D-C voltage at its input reaches about 85 volts.

In starting the motor, single phase 230 volts A-C is applied to L1 and L2 by closing a switch, not shown. Since contacts 31 initially are closed, coil 79 is energized by the line voltage and closes normally open contacts 73 and 75. This allows starting capacitors 69 and 71 and starting windings 63 and 65 to apply a large starting phase shift to the main windings 21 and 23 of the motor for starting purposes. The A-C voltage across coil 65 is rectified to D-C by rectifier 37 and applied to relay coil 35. When the D-C voltage from rectifier reaches about 85 volts (when the motor reaches about ¾ of its maximum running r.p.m.), coil 35 opens contacts 31, thereby de-energizing coil 79. This allows contacts 73 and 75 to open, disconnecting capacitors 69 and 71 and starting windings 63 and 65 from the main windings. The motor continues to run on 230 volts A-C, single phase.

Since the relay coil 35 has D-C applied thereto, once it is actuated, it will remain actuated to maintain contacts 31 open until the voltage at its input drops to about zero. Thus line voltage fluctuations or motor overload will not cause the contacts 31 to open and close thereby protecting the starting capacitors 69 and 71 and starting windings 63 and 65.

In the embodiment of FIG. 4, starting windings 63 and 65 are rated at 230 volts. Coil 79 is energized at 230 volts for closing contacts 73 and 75. The capacitance of starting capacitors 69 and 71 is about 750 microfarads each.

The motor of FIG. 4 may be constructed to operate on either 115 or 230 volts A-C, single phase. In such an embodiment, starting windings 63 and 65 will be rated at 115 volts. For 115 volt operation, main windings 21 and 23 will be connected parallel; leads 67 and 77 will be connected across both of windings 21 and 23; and leads 39 and 41 will be connected across both of starting windings 63 and 65. For 230 volt operation, lead 67 will be connected between main windings 21 and 23 and lead 77 will be connected to L1. Leads 39 and 41 will be connected across both of starting windings 63 and 65.

Figure 5:
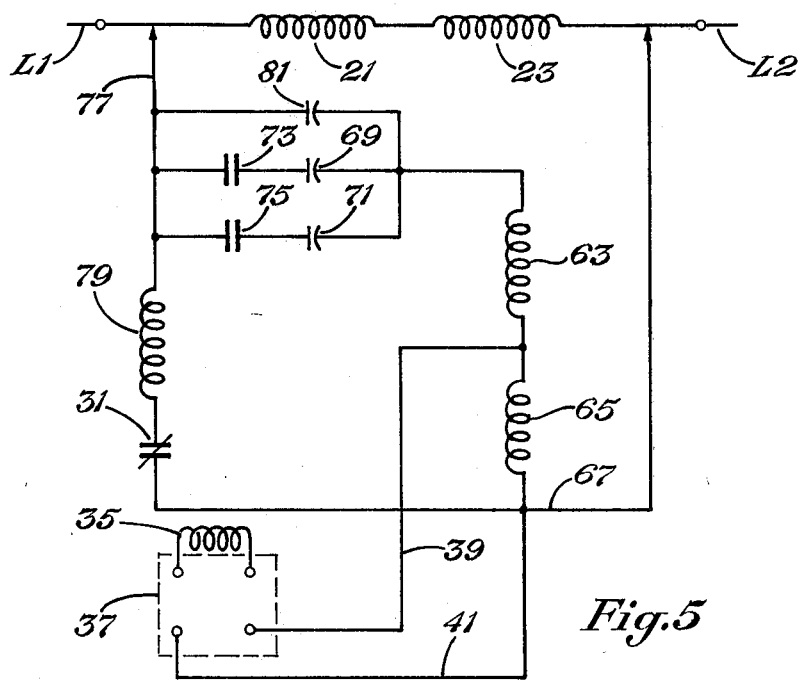
FIG. 5 is an electric schematic of a large capacitor-start, capacitor-run electric motor connected to 230 volts, single phase, and which employs a D-C relay control for relieving the starting capacitors of the motor.

FIG. 5 illustrates the D-C relay control 35, 37 connected to a three h.p. or greater capacitor-start, capacitor-run motor. Like references characters identify like components as described in connection with the systems of FIGS. 1 and 4. A running capacitor 81 is connected to starting coil 63 and lead 77. The D-C relay control 35, 37 operates in the same manner as described in connection with the system of FIG. 4 in relieving starting capacitors 69 and 71. The starting windings 63 and 65, however, stay in the circuit through running capacitor 81. The capacitance of running capacitor 81 may be about 40 microfarads.

What is claimed is:
1. An A-C motor, comprising:
main electrical windings,
starting electrical winding means coupled to said main electrical windings,
starting capacitor means coupled to said starting electrical winding means,
normally open contact means coupled to said starting capacitor means and to said main electrical windings,
electrical coil means and normally closed relay contacts coupled to said main electrical windings,
said electrical coil means closing said normally open contact means when energized,
rectifier means coupled across at least a portion of said starting electrical winding means for converting A-C power to D-C power, and
a relay coil coupled to the output of said rectifier means for opening said relay contacts when a predetermined level of D-C voltage is applied to said relay coil for de-energizing said electrical coil means whereby when line voltage is applied to said main electrical windings, said electrical coil means is energized allowing the motor to start and when said predetermined level of D-C voltage is applied to said relay coil, said relay coil opens said relay contacts resulting in said electrical coil means becoming de-energized disconnecting at least said starting capacitor means from said main electrical windings.

2. An A-C motor, comprising:
main electrical windings,
starting electrical winding means coupled to said main electrical windings,
starting capacitor means coupled to said starting electrical winding means,
normally open contact means for connecting and disconnecting said starting capacitor means and said starting electrical winding means to and from said main electrical windings,
electrical coil means and normally closed relay contacts coupled to said main electrical windings,
said electrical coil means closing said normally open contact means when energized,
rectifier means coupled across at least a portion of said starting electrical winding means for converting A-C power to D-C power, and a relay coil coupled to the output of said rectifier means for opening said relay contacts when a predetermined level of D-C voltage is applied to said relay coil for de-energizing said electrical coil means whereby when line voltage is applied to said main electrical windings, said electrical coil means is energized allowing the motor to start and when said predetermined level of D-C voltage is applied to said relay coil, said relay coil opens said relay contacts resulting in said electrical coil means becoming de-energized, disconnecting said starting capacitor means and said starting electrical winding means from said main windings.

3. An A-C motor, comprising:

main electrical windings, starting electrical winding means coupled to said main electrical windings, starting capacitor means coupled to said starting electrical winding means, normally closed relay contacts coupled to said starting capacitor means and to said main electrical windings, rectifier means coupled across said starting electrical winding means for converting A-C power to D-C power, and a relay coil coupled to the output of said rectifier means for opening said relay contacts when a predetermined level of D-C voltage is applied to said relay coil whereby when line voltage is applied to said main electrical windings, the motor will start and when said predetermined level of D-C voltage is applied to said relay coil, said relay coil opens said relay contacts disconnecting at least said starting capacitor means from said main electrical windings.

4. An A-C motor, comprising:

main electrical windings, starting electrical winding means coupled to said main electrical windings, normally closed relay contacts for connecting and disconnecting said starting electrical winding means to and from said main electrical windings, rectifier means coupled across said starting electrical winding means for converting A-C power to D-C power, and a relay coil coupled to the output of said rectifier means for opening said relay contacts when a predetermined level of D-C voltage is applied to said relay coil whereby when line voltage is applied to said main electrical windings, the motor will start and when said predetermined level of D-C voltage is applied to said relay coil said relay coil opens said relay contacts disconnecting said starting electrical winding means from said main electrical windings.

5. The A-C motor of claims 1 or 2, wherein:

said rectifier means has two input leads coupled across at least a portion of said starting electrical winding means for converting A-C power to D-C power.

6. The A-C motor of claims 3 or 4, wherein:

said rectifier means has two input leads coupled across said starting electrical winding means for converting A-C power to D-C power.

7. The A-C motor of claim 3, wherein:

when said predetermined level of D-C voltage is applied to said relay coil, said relay coil opens said relay contacts disconnecting said starting capacitor means and said starting electrical winding means from said main electrical windings.

8. The A-C motor of claims 1,2,3 or 4 wherein:

said relay coil and said normally closed relay contacts are characterized such that when said predetermined level of A-C voltage is applied to said relay coil and said relay coil opens said relay contacts, said relay contacts will remain open until the voltage at the input of said relay coil drops to about zero.

9. The A-C motor of claims 1 or 2, wherein:

said rectifier means has two input leads coupled across at least a portion of said starting electrical winding means for converting A-C power to D-C power and said relay coil and said normally closed relay contacts are characterized such that when said predetermined level of A-C voltage is applied to said relay coil and said relay coil opens said relay contacts, said relay contacts will remain open until the voltage at the input of said relay coil drops to about zero.

10. The A-C motor of claims 3 or 4 wherein:

said rectifier means has two input leads coupled across said starting electrical winding means for converting A-C power to D-C power and said relay coil and said normally closed relay contacts are characterized such that when said predetermined level of A-C voltage is applied to said relay coil and said relay coil opens said relay contacts, said relay contacts will remain open until the voltage at the input of said relay coil drops to about zero.

* * * * *